COLOR TELEVISION PICKUP TUBES

Filed Nov. 16, 1951

INVENTOR
ARTHUR L. TIRICO
BY
Roderick Malcolm
ATTORNEY

United States Patent Office 2,755,401

Patented July 17, 1956

2,755,401

COLOR TELEVISION PICKUP TUBES

Arthur L. Tirico, Belleville, N. J., assignor to Radio Corporation of America, a corporation of Delaware Application November 16, 1951, Serial No. 256,705

12 Claims. (Cl. 313—65)

This invention relates to color television cameras which are all-electronic and require but a single pickup tube, and to improved single pickup tubes for such cameras. More particularly it relates to all-electronic color television cameras using the kind of single pickup tubes which have a multi-planar image-receiving screen-assembly with different photo-sensitivities for the respective planar surfaces thereof, and to improvements in such tubes.

There is a trend in the color television art toward using only single-pickup-tube cameras. This is due to the fact that cameras which employ a plurality of pickup tubes, despite the great advantage that they can be built with separate (and even stationary) color filters, invariably entail many very serious disadvantages such as registration difficulties, optical system complications, portability limitations, and so forth.

There also is a trend toward using only all-electronic types of single-pickup-tube cameras. This is due to the fact that the electro-mechanical types of single-pickup-tube cameras, e. g., one which uses a more-or-less conventional black-and-white camera tube in a sequential type of operation and in conjunction with a moving filter such as a rotating color disc, has most of the characteristic disadvantages of electro-mechanical devices as compared to all-electronic ones, i. e., slowness, noisiness, susceptibility to wear, and so forth. Incidentally, it should be noted that the electro-mechanical type of single-pickup-tube camera, like the multi-pickup-tube camera does have the great advantage of permitting the use of separate color filters.

In its present state the prior art already includes a pickup tube, as shown and described in copending U. S. application Serial No. 157,443, filed April 22, 1950 (now U. S. Patent 2,614,235), which makes possible an all-electronic, single-pickup-tube, color-television camera. This tube, which has a multi-planar image-receiving screen-assembly, attains color separation by using, on the respective planar surfaces thereof, different photo-sensitive materials which are responsive to light in complementary parts of the visible-light spectrum. It has the limitation of not permitting the use of separate color filters and of therefore attaining only a limited degree of color separation.

This tube has other limitations which arise from the fact that the electrons, which are employed for analyzing the charge images generated in the image-receiving screen-assembly, must have their directions of travel reversed at one or more levels of penetration into the screen-assembly in order to read a corresponding one or more of the charge images. For example, embodiments of the tube in which a single electron gun is used have the limitation that they are restricted to sequential operation, e. g. field, line, or "dot" sequential, since electrons from the same gun can only be reversed at one level at a time. Other embodiments, in which a plurality of guns is used to permit simultaneous operation have the limitation of entailing electron-optical complications some of which can lead to very difficult registration problems.

Another of its limitations, which arises from the fact that the back of the image-receiving screen-assembly must be foraminous for electron-transparency, is that a considerable part of the image light, of which there is usually none to spare, passes uselessly right through the screen-assembly to be wasted in the back of the tube.

It is one object of this invention to devise a color television camera using a multi-planar pickup tube, such as that disclosed in the above-mentioned copending application or any of those disclosed herein, in which color separation is aided by a light-optical means even though the pickup tube does not permit the use of the separate-color-filters as such.

It is another object of this invention to provide multi-planar single pickup tubes which are capable of simultaneous operation without using more than one electron gun.

It is another object of this invention to provide multi-planar single pickup tubes in which none of the object light which reaches the image-receiving screen-assembly is wasted by passing uselessly through it.

In general the camera improvements disclosed herein are attained by using a pickup tube having a multi-planar screen-assembly in combination with an optical means, such as a refractive optic which is uncorrected for chromatic aberration, for receiving full color light from an object and focusing it on and into the multi-planar screen-assembly with all of its rays of different respective wave lengths coming into focus in different image planes. This makes possible a camera whose color separation capability is a function of the product of (1) the color separation of its optical means and (2) the average selectivity of the photo-sensitive materials used on the different planar surfaces of the screen-assembly of the pickup tube, rather than simply of the average selectivity alone. In general the multi-planar screen improvements are attained by using structural arrangements in which, as one feature, the object light and the electron beam both impinge on the same ("input" or "front") side of the image-receiving screen-assembly. And, as another feature, this screen-assembly includes a plurality of planar electrodes of which all but one is foraminous and in which those which are progressively nearer to said "input" side have progressively larger ratios of foraminous area to solid area, and therefore progressively greater electron and light transparencies. These features singly and/or in combination offer the following advantages: (1) that the screen electrodes can share both the object light and the electron beam even if they are made of opaque material, e. g., sheet metal; (2) that the photo-sensitive coatings, and the charge images which they generate, may be on the sides of the electrodes which face towards the electron source whereby a single gun will suffice for simultaneous operation since the direction of the electrons will never need to be reversed; and (3) that, since electrons do not need to enter the back of the screen-assembly, its rearmost planar electrode can be a solid metal sheet, whereby none of the light impinging in the input side of the screen-assembly will be able to pass entirely through it to be wasted in the back of the tube.

Figures 1, 2, 3, 4, 5:
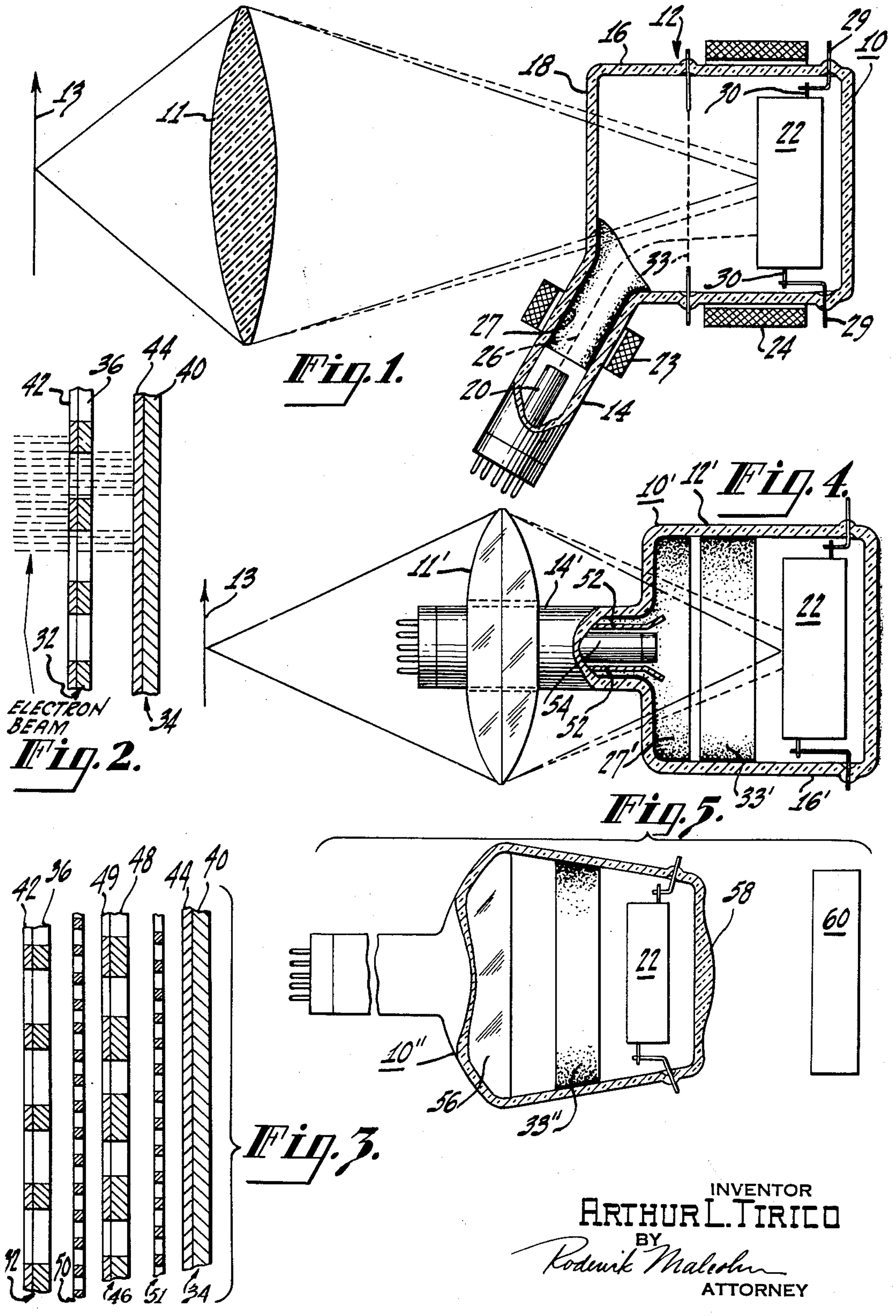
Fig. 1 represents a color television camera embodying both camera and pickup tube features of the present invention.
Figs. 2 and 3 represent very greatly magnified, fragmentary, cross-sectional views of two types of screen-assemblies suitable for use in pickup tubes of the kind shown herein, their various dimensions not necessarily being enlarged to the same extent; and, Figs. 4 and 5 represent other color television cameras which also embody both camera and pickup tube features of the present invention.

Two principal elements of the color television camera shown in Fig. 1 are a pick-up tube 10 and a refractive optic 11.

The tube 10 includes a "pipe" shaped envelope 12 having an off-axis neck 14, a bulb 16 and a window 18. An electron gun 20 is located in the neck 14 for projecting an electron beam toward an image-receiving screen-assembly (represented generally by block 22) which is contained in the end of bulb 16 opposite the window 18. In the operation of this camera the optic 11 receives full color light from an object 13 and focuses it on and into the screen assembly 22.

A deflection yoke 23 is mounted on the neck 14 as a suitable means for deflecting the electron beam in two coordinates to produce a picture raster. As can easily be done according to the prior art, the deflection system should include a means for preventing or correcting keystone distortion of the raster.

"Normalizing" means are provided for causing the final approach of the electron beam to any part of the image-receiving side of the screen-assembly 22 to be at right angles thereto. This is advantageous in that it causes the electron beam to simultaneously impinge on only sub-elementary areas of the different charge images which are in proper registry with each other.

Broadly stated a practical requirement to be met is that the final electron approach paths should be substantially parallel to each other and to the axis of the optic 11. The normalizing means shown in Fig. 1 comprises a pair of electrodes 27, 33 between which an asymmetric electro-static electron optic can be established to achieve considerable normalizing and a magnetic focusing coil 24 for producing magnetic flux lines which effectively act as electron conduits and which are parallel to the axis of optic 11 over all of the region of the final approach paths to the screen-assembly 22. Under the influence of these normalizing means electrons from the gun 20 will follow paths such as that represented by dotted line 26. It is to be understood that the present disclosure does not purport to include improvements in normalizing means as such and that practice of the present invention does not depend on the use of any particular type of normalizing means.

The electrode 27 shown herein is a conductive coating carried on part of the inner surface of the envelope 12. While the portion of this coating which extends into the neck 14 and around the sides of the bulb 16 may be of opaque material, such as aquadag, any portion which extends over the front end of the bulb, i. e., over the window 18, should be of transparent material, such as the product "nesa" manufactured by the Pittsburgh Plate Glass Co. of Pittsburgh, Pennsylvania. Depending on how the tube 10 is operated, and/or on whether the electron optic 27, 33 is to be accelerating or retarding, this coating may act as a final electron accelerating electrode or as a part thereof. In typical operation of the tube 10 where this coating does so act it may be polarized at a potential of the order of a few hundred volts, e. g., 300 volts, while the cathode of the gun 20 is at ground potential. This will provide enough acceleration to prevent the beam from spreading excessively before it gets into the field of focusing coil 24.

Sometimes it is desirable for the beam to reach its target, i. e., the screen-assembly 22, at a very low velocity. While this can be accomplished by polarizing one or more of the elements of the screen-assembly 22 below the potential of the final accelerating electrode, it is also possible to pre-decelerate it in the electron optic 27, 33. In such a case the electrode 33 is polarized at a lower potential than the electrode 27.

While it is possible to make the electro-static optic 27, 33 so that the electrode 33 is a tubular wall coating (like the electrodes 33' and 33'' in Figs. 4 and 5) on the inside side walls of the bulb 16, it may be advantageous for it to be a flat, foraminous element as represented in Fig. 1. Obviously it is best that such an element be located in a region where both the object light and the electrons are still somewhat out of focus; that it have the largest possible ratio of foraminous area to solid area; that it be flat; and that it have as fine a mesh as possible.

Each of a plurality of thin resilient rods 29 has one of its ends sealed through to the outside of the bulb 16 to constitute a terminal pin while its other end (which extends into the bulb) is bent back at right angles to provide a resilient support for the screen-assembly 22 and/or for one of its planar electrodes. To this end the bent-over end of each rod 29 is connected to a respective pin 30 extending from some part of the screen-assembly 22.

Most of the electrodes used in any embodiments of the screen-assembly 22 are made of sheet metal or wire mesh and are very thin for their size. Since they must be positioned very closely adjacent to each other without touching, they should all be perfectly flat. To this end, in case they are not thick enough to retain the desired flatness, each electrode may be mounted, stretched tautly over a rigid frame in the manner of a drumhead. Reference is made to co-pending applications Serial No. 145,861, filed February 23, 1950 (now U. S. Patent 2,590,764), and Serial No. 157,443, filed April 22, 1950 (now U. S. Patent No. 2,614,235), in which suitable structures for this purpose are shown and fully described as well as a suitable process for making foraminous metal backing plates comprised in some of the photo-sensitive screens.

Fig. 2 shows a portion of a type of image-receiving screen-assembly 22 which may be used in any of the tubes shown herein where they are to be employed in two-component color television systems. It comprises front and back photo-sensitive screens represented generally at 32, and 34. While operativeness of the pickup tube in no way depends on the photo-sensitive screens having any particular type (*s*) of reaction to light, it will not be able to attain any color separation independently of the optic 11 unless they have some kind of selective photosensitivity with respect to light in complementary parts of the visible-light spectrum. Thus, for example, in arrangements in which, as a matter of choice, both of the screens 32 and 34 may be photo-conductive or both may be photo-emissive or one may be of one type and the other of the other, each of them should have its sensitivity, whatever it may be, in a different part of the visible light spectrum. If it does not the total color separation attained will be limited to that provided by the optic 11.

In general, each of the screens of the screen-assembly 22, whether it is of one type or the other, will translate a respective portion of the object light into a charge image. A photo-emissive screen does so directly by emitting unequal numbers of electrons from different parts of its surface according to the unequal intensities of the incident light. A photo-conductive screen produces a charge image indirectly. It does so by first producing a pattern of different values of front-to-back conductivity in the active film. As a result, unequal leakage occurs between an initially uniform charge laid down by the beam on the front surface of the film and the conductive backing plate to which its back surface is adherent, whereby the uniform charge is converted into a charge image.

Whether a screen is photo-conductive or photo-emissive one of the functions of its metallic backing plate is to capacitively couple the charge image to a respective signal output terminal.

During each scansion the beam wipes out the charge image on each screen by either adding enough negative charge to each picture element, or effectively subtracting enough from it, to restore the entire front surface of the screen to a uniform equilibrium potential. A low-velocity beam adds negative charge to a positive-going charge image by depositing primary electrons on the screen. A high-velocity beam "subtracts" negative charge from a negative-going charge image by causing secondary emission from the screen. The resulting small increments of current to or from the front surface are capacitively coupled to the signal output terminal by the backing plate.

In each of the image-receiving screen-assemblies shown herein the front screen(s) must allow part of the object light and also some of the beam current to pass unimpeded to the back screen(s). Accordingly each screen in front of the back screen comprises as its main structural part a foraminous thin metal plate. The many closely-spaced foramina of each such plate provides light transparency and electron permeability while the solid or unapertured portions of its front surface provides a foundation for the screen's photo-sensitive coating and acts as the required conductive backing plate.

In Fig. 2 the screens 32 and 34 are represented as respectively comprising a foraminous backing plate 36 and a solid backing plate 40 and photo-sensitive coatings 42 and 44.

In order that it may provide color separation independently of the pickup tube the refractive optic 11 is uncorrected for chromatic aberration and may even be designed to accentuate it. However it should be corrected in accordance with the prior art to eliminate other aberrations. As a result instead of its having a single image plane for visible light of all wave lengths, i. e., a single full-color image plane, it has a very large number of parallel monochromatic image planes extending over a finite distance along the axis of the optic. The exact magnitude of this distance will depend on a number of factors such as the desired light bandwidth, e. g., that of the entire visible spectrum, and the materials and parameters of the optic. Thus this distance, i. e., the difference between the image focal length for visible light of the longest wave length (red) and that of the shortest (blue), may easily be of the order of 80 to 100 mils. Accordingly it is possible to build the pickup tube with its photo-sensitive screens in proper succession and properly spaced so that their color separation and that of the optic complement each other and do so to an optimum degree.

To this end each screen should be positioned in the screen-assembly 22 in a plane where it will receive in sharp focus only object light of wave lengths very near to the single wave length at the center of the limited spectral band wherein its active coating is photo-sensitive. As a result light of said single wave length will be very sharply focused on the screen; light of other wave lengths within the band will be quite sharply focused thereon; and light of wave lengths in other bands will be substantially out of focus thereon.

Obviously, unlike the optical systems of cameras using separate color filters the optic 11 cannot entirely block unwanted light components from reaching certain image-receiving surfaces. However since all of the unwanted light which does reach each of the photo-sensitive screens will be out of focus, its principal effect will be that possibly it may reduce the contrast of the charge image thereon, as though it were flooded with fairly uniform light of the unwanted color, as distinguished from adversely affecting its fidelity.

Actually, moreover, even its effect on the contrast will be very slight as each screen will be quite unresponsive to all of the unfocused light which reaches it since that light will not fall within the limited spectral band in which it is peaked.

It is not difficult to form the photo-sensitive coatings needed for the types of screens shown herein since each of them is simply a uniform coating applied to all of one side of a supporting surface, this being much easier to make than the types of color television cathode ray tube screens which comprise very great numbers of small dot or line-like sub-elements arranged in each case in a very precise predetermined pattern on a uni-planar surface.

As a result this tube can be made in small sizes with small diameter screens.

The image-receiving screen-assembly of Fig. 3, which has one more photo-sensitive screen than that of Fig. 2, is suitable for a camera tube which is to be used in a three component-color television system. Its additional screen, intermediate screen 46, comprises a foraminous metal backing plate 48 and a photo-sensitive coating 49.

If the center of each foramina of one of the two foraminous screens 32, 46 is in alignment with that of a respective foramina of the other, and if the photo-sensitive coatings 42, 44, and 49 have substantially equal sensitivities even though they are sensitive in different spectral ranges, then the respective ratios of foraminous area to solid area for the front, intermediate and back screens may be of the order of 66.6%, 33.3%, and 0.0%. These ratios may still be suitable where the two foraminous screens are in such approximate registry that all normal paths through each foramina of the intermediate screen pass unobstructedly through a corresponding foramina of the front screen even though the centers of these foramina may not be in exact alignment. However, if these two screens are not even registered to this extent the color balance may be adversely affected so that some sort of compensation is needed, e. g.: the use of screen coating materials having unequal sensitivities; unequal video amplification of the output signals; and/or slightly unequal screen biases.

Moreover if moiré distortion is to be avoided all of the foraminous screens should have the same number of foramina per unit area and similar locations for them, e. g., equal spacings between their centers.

The following materials have been found suitable for the coatings of the respective photo-sensitive screens and therefore are mentioned herein by way of example:

*Photo-emission*

| Coating material: | Portion of the spectrum in which it is peaked |
|---|---|
| Silver Caesium | Red |
| Antimony Caesium | Blue |
| Bismuth Caesium | Green |

*Photo-conductive*

| | |
|---|---|
| Antimony trisulfide | Red |
| Red selenium | Blue |
| Zinc selenide | Blue |
| Cadmium | Green |

As is known, it is customary in the case of a photo-emissive screen to use a thin insulating separator (such as mica) between the active photo-emitter and the backing plate to provide a highly insulating carrier for the charge image and to obtain the desired value of capacity for the screen. Accordingly, the photo-sensitive coatings shown in Figs. 2 and 3 herein, such as the coatings 42, 44 and 49, may be considered as representing both the separator and the photo-emissive material which it insulates from the backing plate.

The exact chemical structures of the active films or the exact processes by which they are made are not per se novel features of the present invention, but instead may be chosen from an abundance of appropriate art which is already known or may become known in the future.

Since (1) low-velocity operation of photo-emissive embodiments of the tubes shown herein involves emission of photo-electrons, i. e., in the generation of positive-going charge images; since (2) high-velocity operation of photo-conductive embodiments involves emission of secondary electrons, i. e., in laying down uniform positive charges from which negative-going charge images can develop; and (3) since any kind of operation of any kind of tube shown herein involves reflection from the screens of surplus beam electrons, i. e., those not needed for wiping out the charge images thereon, it may prove advantageous to provide special electron collecting elements, like elements 50, 51 of Fig. 3, within the image-receiving components for avoiding accumulations of electron space charge therewithin.

In this connection a principle which is illustrated by the following should be noted. In high-velocity operation of a photo-conductive tube the "uniform charge" needed before a charge image can evolve tends to assume a potential level equal to that of some part of the tube structure which is near to the screen in question and collects its secondaries. Therefore, for best results, a flat collecting structure should be employed since it will provide a flat collecting field which will cause the "uniform charge" to be as truly uniform as possible.

As mentioned above the static potentials of elements of the image-receiving screen-assembly may provide retarding fields for final deceleration of the beam electrons to desired velocities which are appropriate for respective types of operation and the normalizing optic 27, 33 may provide a retarding field for pre-deceleration. Besides these, if desired, one or more additional foraminous electrodes like the electrode 33 may be mounted between it and the front of the screen-assembly 22 as intermediate deceleration means for controlling the gradients and the configurations of the equipotential surfaces which are set up therebetween.

In addition to their being capable of the various types of operation described or alluded to above, the tubes disclosed herein are also capable of other types of operation which are well known in the art such as the type, sometimes referred to as "high-velocity operation with an effective secondary emission ratio of less than one (1), which is described in the last paragraph of the above-mentioned copending application, Serial No. 157,443 (now Patent 2,614,235).

The camera of Fig. 4 is a modification of that of Fig. 1 whereby the envelope 12' of its tube (10') is straight instead of pipe-shaped. To this end the uncorrected refractive optic 11' used in this camera is an apertured optic which is carried on the neck 14' in coaxial relationship to the bulb 16'. Though it is possible to make this type of optic with a large enough aperture to permit the use of a magnetic deflection yoke, it may be preferable to use electro-static deflection means such as the pairs of plates 52, 54 shown in Fig. 4. In this embodiment it will be necessary for a larger portion of the coating 27' than of the coating 27 of Fig. 1 to be of transparent material.

Fig. 5 shows another camera embodiment of the present invention in which the pickup tube (10'') may be straight instead of pipe-shaped. This is made possible in this camera by the use of a Schmidt optical system comprising a spherical mirror 56 which substantially reverses the direction of the object light causing it to enter the same side of the screen-assembly 22 as the electrons. In the embodiment of Fig. 5 the mirror 56 and the correction plate 58, are built as integral parts of the tube 10'' thereby constituting it a so-called "internal Schmidt" cathode ray television tube.

In order that this Schmidt optic aid in attaining color separation: (1) its correction plate 58 may either be uncorrected for any chromatic aberration which it itself tends to produce or designed to cause (or accentuate) chromatic aberration; and/or (2) a refractive optical element or system 60 may be added to it to introduce this desired effect.

If the mirror 56 comprises a metallic coating, e. g., of aluminum or silver, it may also serve an electrical function as the element of the normalizing electrostatic electron optic of this embodiment which corresponds to the element 27 of Fig. 1.

What is claimed is:

1. A pickup tube comprising within a vacuum envelope: a source of electrons; an image-receiving screen-assembly including a plurality of closely-spaced, substantially-parallel, photo-sensitive, image-receiving planar electrodes; said envelope comprising a transparent wall-portion providing a window for the entry of object light into its interior; said screen-assembly having an input side and being positioned to receive thereon electrons from said source and object light entering the envelope through said window; the planar electrode which is nearest to said input side having within the boundaries of its image-receiving area a large number of separate and very small elementary areas which are transparent to both electrons and light; and all of the image receiving area of the planar electrode which is farthest from said input side being opaque to both electrons and light.

2. An image-receiving screen-assembly for a television cathode ray device comprising: a plurality of closely-spaced, substantially-parallel, photo-sensitive, image-receiving, planar electrodes; said screen-assembly having an image-receiving front side and a back side; the planar electrode which is nearest to said front side having within the boundaries of its image-receiving area a large number of separate and very small elementary areas which are transparent to both electrons and light; and all of the image-receiving area of the planar electrode which is nearest to said back side being opaque to both electrons and light.

3. A pickup tube as in claim 1 in which said input side faces directly toward said window to receive light therethrough along a predetermined axis and said source of electrons is an electron gun positioned to one side of said axis and trained in the general direction of a region which surrounds said axis and lies between said window and said input side.

4. A pickup tube as in claim 1 in which said transparent wall-portion of the envelope is at one end thereof, said light enters the window along a predetermined axis, said source of electrons is an electron gun positioned within the envelope near an opposite end thereof and trained along said axis in the direction of the window, and said assembly is mounted between said two ends of the envelope with its input side facing away from said window and toward said source of electrons.

5. A pickup tube as in claim 4 and further comprising a spherical mirror within said envelope having an aperture near its center through which said electrons pass in moving from said source to said assembly and whose concave side faces across an enclosed space within said envelope toward said window for receiving said object light entering the envelope therethrough to reflect it onto said input side of the assembly.

6. A pickup tube as in claim 5 in which said window comprises a Schmidt-optic correction plate adapted to introduce chromatic aberrations into said object light as it moves toward said mirror.

7. A pickup tube comprising within a vacuum envelope a source of electrons and an image-receiving screen-assembly, said envelope comprising a transparent window for the entry of object light into its interior, said screen-assembly having an input side and being positioned to receive thereon electrons from said source and object light entering the envelope through said window, said screen-assembly including at least two substantially-parallel photo-sensitive, image-receiving planar electrodes one near the input side of the component and one near its opposite side, the planar electrode which is nearest to said input side comprising a foraminous conductive backing plate having a photo-sensitive coating and its input side, and the other planar electrode comprising a non-foraminous conductive backing plate having a photo-sensitive coating on its input side.

8. A pickup tube as in claim 7 in which said image-receiving screen-assembly further comprises a foraminous electron-collecting electrode between said planar electrodes.

9. A pickup tube as in claim 8 in which said collecting electrode has a higher ratio of foraminous area to solid area than said foraminous planar electrode.

10. A pickup tube as in claim 7 in which said screen-assembly comprises a third photo-sensitive image-receiving planar electrode positioned in parallel relationship to and between the two first-mentioned planar electrodes, the third electrode comprising a foraminous conductive backing plate having a photo-sensitive coating on its input side, the ratio of foraminous area to solid area of the planar electrode nearest said input side being larger than that of the third planar electrode.

11. A pickup tube as in claim 10 in which said third electrode and the planar electrode which is nearest said input side have the same number of foramina per unit image-receiving area and similar locations for their foramina.

12. A pickup tube comprising a pipe-shaped vacuum envelope, a multi-planar image-receiving screen-assembly in the bulb portion of the envelope, an electron gun mounted in the neck of the envelope for projecting electrons through it and toward said screen-assembly, means for directing said electrons along paths having substantially straight initial and terminal portions, and curved intermediate portions, said screen-assembly including one photo-sensitive planar screen on its input side which is partially transparent to both electrons and light and another on its output side which is entirely opaque thereto, and said screen-assembly being positioned in the bulb simultaneously to receive on its said input side electrons moving in the terminal portions of their paths and object light entering the bulb along an optical axis which is substantially parallel to said terminal portions of the electron paths.

References Cited in the file of this patent

UNITED STATES PATENTS

| | | |
|---|---|---|
| 2,164,555 | Truell | July 4, 1939 |
| 2,212,923 | Miller | Aug. 27, 1940 |
| 2,264,748 | Flechsig | Dec. 2, 1941 |
| 2,368,884 | Schade | Feb. 6, 1945 |
| 2,442,961 | Ramberg | June 8, 1948 |
| 2,507,958 | Cassman | May 16, 1950 |
| 2,550,316 | Wilder | Apr. 24, 1951 |
| 2,563,197 | Sziklai et al. | Aug. 7, 1951 |
| 2,614,235 | Forgue | Oct. 14, 1952 |
| 2,661,392 | Lubszynski et al. | Dec. 1, 1953 |